United States Patent

Lunenschloss

[15] 3,665,780

[45] May 30, 1972

[54] TENSIONING ASSEMBLIES FOR DRIVE CHAINS

[72] Inventor: John T. Lunenschloss, c/o Air-Lec Industries, Inc., 3300 Commercial Avenue, Madison, Wis. 53714

[22] Filed: Oct. 9, 1970

[21] Appl. No.: 79,461

[52] U.S. Cl. ............... 74/242.9, 74/242.1 R, 74/242.1 TA
[51] Int. Cl. ............................................. F16h 7/08, F16h 7/12
[58] Field of Search ........... 74/242.1 R, 242.1 TA, 242.15 R, 74/242.9

[56] References Cited

UNITED STATES PATENTS

| 1,227,541 | 5/1917 | Kaplan | 74/242.1 TA |
| 2,985,027 | 5/1961 | Murray | 74/242.1 |
| 433,446 | 8/1890 | Cleveland | 74/242.1 X |
| 2,795,135 | 6/1957 | Kremser | 74/242.1 X |
| 2,897,683 | 8/1959 | Carver | 74/242.1 |

FOREIGN PATENTS OR APPLICATIONS

| 592,101 | 7/1925 | France | 74/242.1 TA |

*Primary Examiner*—Leonard H. Gerin
*Attorney*—Joseph G. Werner, Theodore J. Long, John M. Winter and James A. Kemmeter

[57] ABSTRACT

An idler sprocket assembly for keeping tension on the drive chain of a drive assembly. The device has a stationary but adjustable mounting bracket positioned between a drive shaft and a driven shaft. The drive chain runs over an idler sprocket carried on the end of a pivotally mounted swing arm for maintaining tension on the chain.

2 Claims, 2 Drawing Figures

INVENTOR:
JOHN T. LUNENSCHLOSS

ATTORNEYS

TENSIONING ASSEMBLIES FOR DRIVE CHAINS

BACKGROUND OF THE INVENTION

This invention relates to an idler sprocket assembly for maintaining tension on a drive chain.

In the past, idler sprocket tensioning assemblies have typically been of the resilient type mounted on springs or rubber fastenings.

SUMMARY OF THE INVENTION

This invention is basically a new drive chain tensioning device which is particularly well suited for use on drive assemblies subjected to considerable hard use in rugged off-the-road vehicles such as all terrain vehicles and the like.

The chain tensioning assembly has an idler sprocket mounted on the end of a swing arm which may pivot fore and aft as the drive chain rides over the idler sprocket. The pivot axis of the swing arm can be moved toward or away from the drive chain to adjust the tension therein.

Further objects, features and advantages of my invention will be apparent from the following detailed description taken in conjunction with the accompanying drawings showing a preferred embodiment of the invention for exemplification.

DESCRIPTION OF A PREFERRED EMBODIMENT

Figure 1:
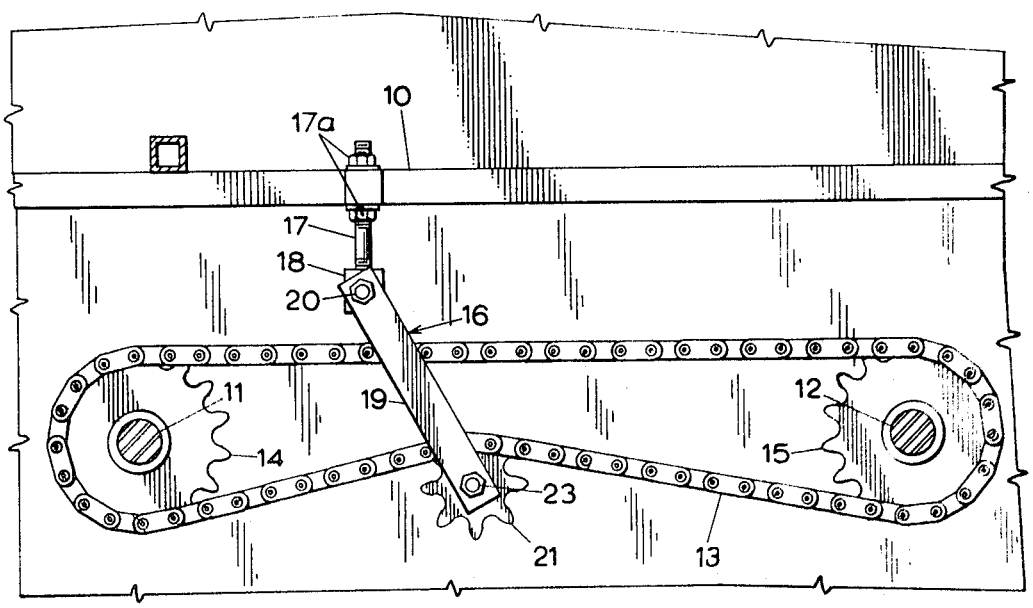
FIG. 1 is a fragmentary front elevation view of a chain drive mechanism having an idler sprocket chain tensioning assembly embodying my invention thereon.

Referring now more particularly to the drawings wherein like numerals refer to like parts throughout the several views, FIG. 1 shows a portion of a frame member 10 of a vehicle or the like having a rotatable drive shaft 11 and a driven shaft 12. A drive chain 13 is trained over sprockets 14 and 15 mounted on shafts 11 and 12, respectively.

Figure 2:
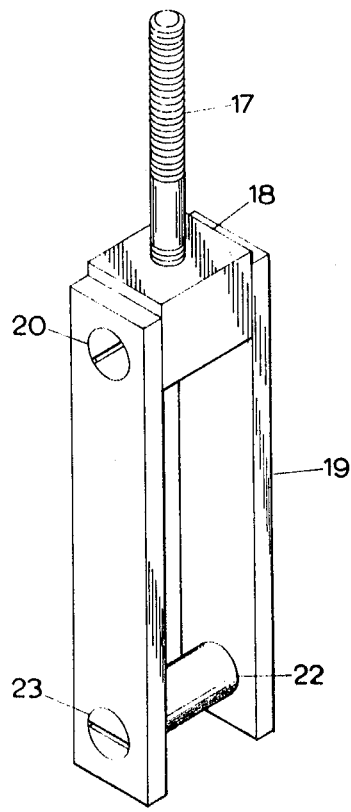
FIG. 2 is an isometric view of the mounting bracket and swing arm assembly of the chain tensioning assembly shown in FIG. 1.

The chain tensioning assembly embodying this invention is referred to generally by numeral 16 in FIG. 1. As shown in FIGS. 1 and 2, the assembly is attached to the frame member 10 by a mounting bracket comprising a threaded stud 17, nut assemblies 17a, and a block member 18.

A swing arm assembly comprising a pair of arms 19 is pivotally attached at its upper end to the block member 18 by a screw 20 providing a pivot axis for said swing arm assembly parallel to the shafts 11 and 12.

An idler sprocket 21 is rotatably mounted on a sleeve 22 secured between the lower ends of swing arms 19 by a screw 23 to provide an axis of rotation for said idler sprocket parallel to the pivot axis of the swing arm assembly.

The drive chain 13 extends through the swing arm assembly and the lower run of the chain extends over the idler sprocket 21 between the pivot axis of the swing arm assembly and the axis of rotation of the idler sprocket.

As shown in FIG. 1, the swing arm assembly 19 pivots from the vertical on screw 20 to maintain the desired tension on the drive chain.

The tension on the drive chain can be adjusted by turning the nut assemblies 17a on threaded stud 17 to move the pivot axis of the swing arm assembly toward or away from the drive chain.

It is understood that the present invention is not confined to the particular construction and arrangement of parts herein illustrated and described, but embraces all such modified forms thereof as come within the scope of the following claims.

I claim:

1. In a drive assembly having a drive shaft, a driven shaft substantially parallel to said drive shaft, and a drive chain trained over sprockets on said shafts, a self-regulating chain tensioning assembly comprising:
   a. a mounting bracket fixedly positioned between the drive shaft and the driven shaft,
   b. a swing arm assembly depending from said mounting bracket for free pivotable movement from a vertical position toward and away from said shafts about a pivot axis substantially parallel to said shafts in response to the direction of movement of said chain, and
   c. an idler sprocket rotatably journalled on said swing arm assembly, said drive chain running over said idler sprocket between the pivot axis of said swing arm and the axis of rotation of said idler sprocket.

2. In a drive assembly, a chain tensioning assembly as specified in claim 1 wherein said mounting bracket has an adjustable threaded member for moving the pivot axis of said swing arm assembly toward and away from the drive chain.

* * * * *